United States Patent
Smith et al.

(10) Patent No.: US 9,195,450 B2
(45) Date of Patent: *Nov. 24, 2015

(54) PROGRAM EXECUTION SERVICE WINDOWS

(71) Applicant: Microsoft Technology Licensing, LLC, Redmond, WA (US)

(72) Inventors: Kyle Smith, Seattle, WA (US); Adrian Maziak, Sammamish, WA (US); Djana Milton, Lakewood, WA (US); Dattatraya Rajpure, Redmond, WA (US); Gaurav Dhawan, Redmond, WA (US); Shafqat Khan, Lynnwood, WA (US); Roxana Drake, Redmond, WA (US); Khuzaima Iqbal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/948,065

(22) Filed: Jul. 22, 2013

(65) Prior Publication Data

US 2014/0165051 A1   Jun. 12, 2014

Related U.S. Application Data

(63) Continuation of application No. 11/317,645, filed on Dec. 22, 2005, now Pat. No. 8,495,613.

(51) Int. Cl.
*G06F 9/445* (2006.01)
*G06F 9/48* (2006.01)

(52) U.S. Cl.
CPC *G06F 8/65* (2013.01); *G06F 9/445* (2013.01); *G06F 9/4843* (2013.01); *G06F 8/60* (2013.01)

(58) Field of Classification Search
None
See application file for complete search history.

(56) References Cited

U.S. PATENT DOCUMENTS

| 5,155,847 | A | * | 10/1992 | Kirouac et al. | 709/221 |
|---|---|---|---|---|---|
| 5,210,872 | A | * | 5/1993 | Ferguson et al. | 718/102 |
| 5,392,430 | A | * | 2/1995 | Chen et al. | 718/102 |
| 5,465,354 | A | * | 11/1995 | Hirosawa et al. | 718/106 |
| 5,473,772 | A | * | 12/1995 | Halliwell et al. | 717/171 |
| 5,479,601 | A | * | 12/1995 | Matheny et al. | 715/700 |
| 5,606,695 | A | * | 2/1997 | Dworzecki | 705/7.12 |
| 5,680,548 | A | * | 10/1997 | Trugman | 709/226 |
| 5,708,812 | A | * | 1/1998 | Van Dyke et al. | 717/171 |
| 5,742,829 | A | * | 4/1998 | Davis et al. | 717/178 |

(Continued)

OTHER PUBLICATIONS

"Planning and Installation Guide", IBM, 2003, <http://publib.boulder.ibm.com/tividd/td/TWS/SH19-4555-01/en_US/PDF/plan_ins.pdf>, pp. 1-144.*

(Continued)

*Primary Examiner* — Thuy Dao
*Assistant Examiner* — Samuel Hayim
(74) *Attorney, Agent, or Firm* — Henry Gabryjelski; Kate Drakos; Micky Minhas

(57) ABSTRACT

Techniques for guaranteeing that a software program is executed on a machine only during designated periods of time are provided. Service windows define time periods during which software programs targeted to execute on a machine are allowed to execute on the machine. On the machine, the service windows work in conjunction with a client process that is executing on the machine to guarantee execution of the software programs by the client process only during available service windows.

15 Claims, 8 Drawing Sheets

(56) References Cited

U.S. PATENT DOCUMENTS

| | | | | |
|---|---|---|---|---|
| 5,764,992 | A * | 6/1998 | Kullick et al. | 717/170 |
| 5,826,080 | A * | 10/1998 | Dworzecki | 718/103 |
| 6,023,586 | A * | 2/2000 | Gaisford et al. | 717/178 |
| 6,049,868 | A * | 4/2000 | Panwar | 712/244 |
| 6,182,238 | B1 * | 1/2001 | Cooper | 714/2 |
| 6,263,358 | B1 * | 7/2001 | Lee et al. | 718/100 |
| 6,263,359 | B1 * | 7/2001 | Fong et al. | 718/103 |
| 6,272,536 | B1 * | 8/2001 | van Hoff et al. | 709/217 |
| 6,279,153 | B1 * | 8/2001 | Bi et al. | 717/171 |
| 6,317,774 | B1 * | 11/2001 | Jones et al. | 718/107 |
| 6,323,882 | B1 * | 11/2001 | Jerome et al. | 715/744 |
| 6,345,386 | B1 * | 2/2002 | Delo et al. | 717/176 |
| 6,546,554 | B1 * | 4/2003 | Schmidt et al. | 717/176 |
| 6,557,054 | B2 * | 4/2003 | Reisman | 710/33 |
| 6,571,389 | B1 * | 5/2003 | Spyker et al. | 717/176 |
| 6,625,636 | B1 * | 9/2003 | Skovira | 718/102 |
| 6,667,810 | B1 * | 12/2003 | Jeyachandran et al. | 358/1.14 |
| 6,745,222 | B1 * | 6/2004 | Jones et al. | 718/107 |
| 6,782,302 | B1 * | 8/2004 | Barto et al. | 700/101 |
| 6,801,819 | B1 * | 10/2004 | Barto et al. | 700/99 |
| 6,810,503 | B1 * | 10/2004 | David et al. | 715/201 |
| 6,813,777 | B1 * | 11/2004 | Weinberger et al. | 725/76 |
| 6,993,763 | B2 * | 1/2006 | Hayes, Jr. | 718/102 |
| 7,093,004 | B2 * | 8/2006 | Bernardin et al. | 709/219 |
| 7,533,384 | B2 * | 5/2009 | Chan et al. | 718/102 |
| 7,865,888 | B1 * | 1/2011 | Qureshi et al. | 717/168 |
| 7,979,859 | B2 * | 7/2011 | Li et al. | 718/102 |
| 2002/0002578 | A1 * | 1/2002 | Yamashita | 709/105 |
| 2002/0056079 | A1 * | 5/2002 | Sato et al. | 717/168 |
| 2002/0147974 | A1 * | 10/2002 | Wookey | 717/176 |
| 2002/0156889 | A1 * | 10/2002 | Crudele et al. | 709/224 |
| 2002/0194584 | A1 * | 12/2002 | Suorsa et al. | 717/176 |
| 2002/0198923 | A1 * | 12/2002 | Hayes, Jr. | 709/102 |
| 2003/0046682 | A1 * | 3/2003 | Crespo et al. | 717/178 |
| 2003/0070162 | A1 * | 4/2003 | Oshima et al. | 717/171 |
| 2003/0135643 | A1 * | 7/2003 | Chiu et al. | 709/238 |
| 2003/0149717 | A1 * | 8/2003 | Heinzman | 709/101 |
| 2003/0163469 | A1 * | 8/2003 | Garth et al. | 707/9 |
| 2003/0204547 | A1 * | 10/2003 | Davis et al. | 709/101 |
| 2004/0060044 | A1 * | 3/2004 | Das et al. | 717/171 |
| 2004/0093595 | A1 * | 5/2004 | Bilange | 717/171 |
| 2004/0123297 | A1 * | 6/2004 | Flautner et al. | 718/102 |
| 2004/0187103 | A1 * | 9/2004 | Wickham et al. | 717/168 |
| 2004/0187104 | A1 * | 9/2004 | Sardesai et al. | 717/174 |
| 2004/0255287 | A1 * | 12/2004 | Zhang et al. | 717/171 |
| 2005/0114868 | A1 * | 5/2005 | Conroy et al. | 719/321 |
| 2005/0120106 | A1 * | 6/2005 | Albertao | 709/223 |
| 2005/0278520 | A1 * | 12/2005 | Hirai et al. | 713/1 |
| 2006/0107268 | A1 * | 5/2006 | Chrabieh | 718/100 |
| 2006/0190943 | A1 * | 8/2006 | Haeri | 718/103 |
| 2007/0150815 | A1 * | 6/2007 | Smith et al. | 715/733 |
| 2007/0157192 | A1 * | 7/2007 | Hoefler et al. | 717/168 |
| 2007/0171921 | A1 * | 7/2007 | Wookey et al. | 370/401 |
| 2007/0174410 | A1 * | 7/2007 | Croft et al. | 709/208 |
| 2007/0174429 | A1 * | 7/2007 | Mazzaferri et al. | 709/218 |
| 2008/0134175 | A1 * | 6/2008 | Fitzgerald et al. | 718/1 |
| 2009/0083651 | A1 * | 3/2009 | Kim et al. | 715/771 |
| 2012/0331476 | A1 * | 12/2012 | Saffre | 718/104 |

OTHER PUBLICATIONS

Wenzhang Zhu et al., "Lightweight Transparent Java Thread Migration for Distributed JVM", IEEE, 2003, http://ieeexplore.ieee.org/stamp/stamp.jsp?tp=&arnumber=1240611>, pp. 1-8.*

Gokhan Metan et al. "A Simulation Based Learning Meachanism for Scheduling Systems With Continuous Control and Update Structure", ACM, 2005, <http://delivery.acm.org/10.1145/1170000/1163083/p2148-metan.pdf>, pp. 1-9.*

* cited by examiner

PROGRAM EXECUTION SERVICE WINDOWS

CROSS REFERENCE TO RELATED APPLICATION

This application is a continuation application of U.S. patent application Ser. No. 11/317,645, filed on Dec. 22, 2005, now U.S. Pat. No. 8,495,613, which is incorporated herein in its entirety by reference.

BACKGROUND

It is not uncommon for an enterprise to have hundreds, if not thousands of computer systems. These computer systems typically operate under the control of software, including systems software (i.e., operating systems, drivers, etc.) and application software.

For these enterprises, proper management of software distribution and software updates on their computer systems can be a complex, expensive, daunting and time-consuming task. For example, an enterprise may need to track the software installed on each of the computer systems, including the version and release of the software, as well as the other resources that are on the computer systems. Tracking the software installed on each of the computer systems enables the enterprise to determine where to deploy additional software, software updates, and other resources as required, as well as to determine whether it is in compliance with the applicable software licenses.

Many enterprises utilize commercially available software management products to manage the distribution of software on their computer systems. While these software management products provide adequate software distribution and software update management features that allow scheduling program (e.g., software program) execution on a specific date and time, the software management products are not able to guarantee a time when a program is actually executed on a computer system. This becomes a problem for the enterprises that rely on time-sensitive applications and, thus, do not allow or permit changes to be made to their computer systems outside of designated periods of time.

SUMMARY

Techniques for guaranteeing that a software program is executed on a machine only during designated periods of time are provided. Service windows define time periods during which software programs targeted to execute on a machine are allowed to execute on the machine. On the machine, the service windows work in conjunction with a client process that is executing on the machine to guarantee execution of the software programs by the client process only during available service windows.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
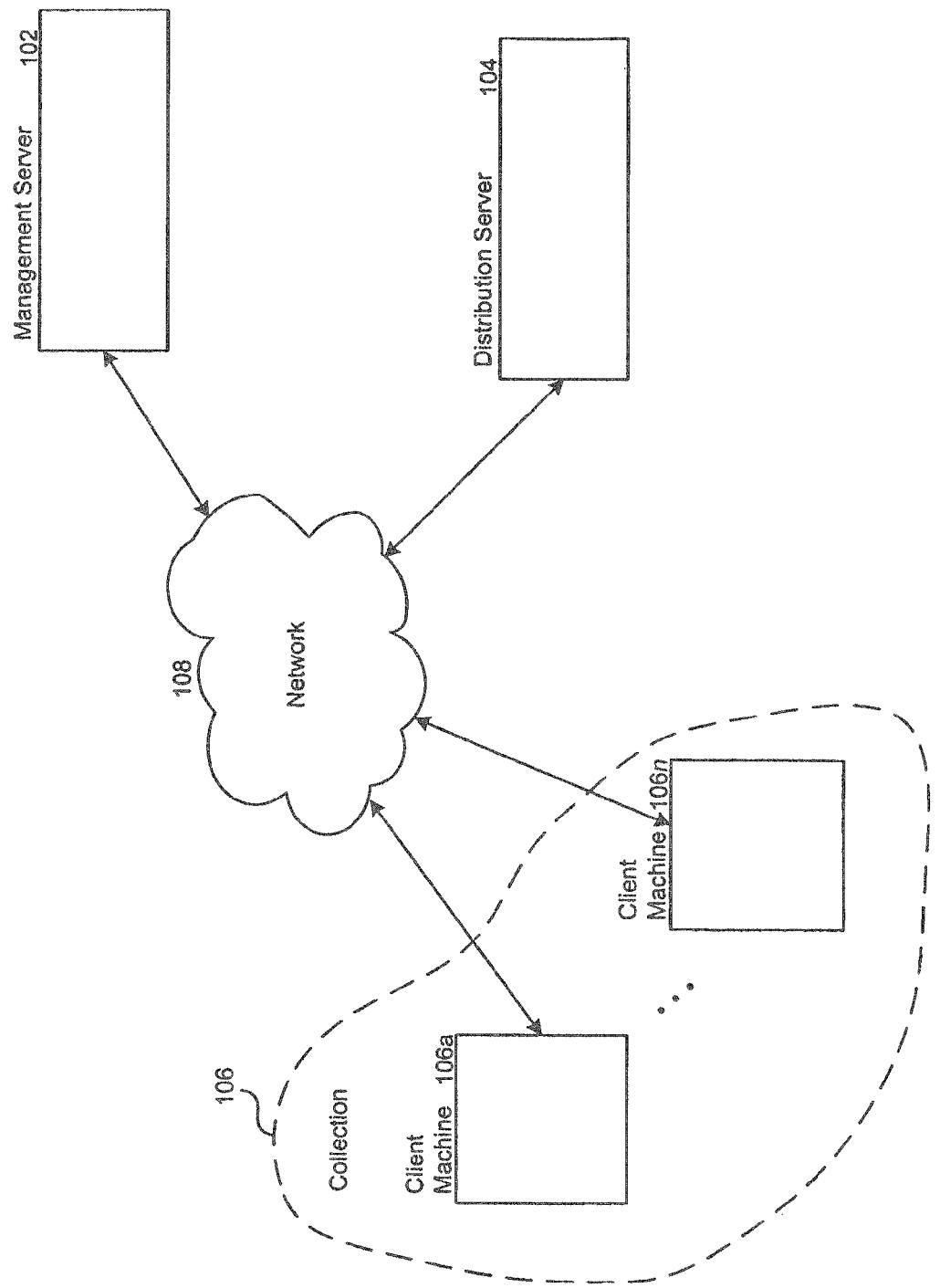
FIG. 1 is a high-level block diagram illustrating an example environment in which a service window deployment system may operate.

Various techniques for guaranteeing that a software program is executed on a computer system (also referred to herein as a "machine") only during designated periods of time are provided. Service windows define time periods during which software programs (e.g., operating system, anti-virus programs, administrative programs, updates to software programs, updates to software programs, and other types of content) targeted to a particular group of one or more machines (also referred to herein as a "collection") are allowed to execute. On each of the machines, the service windows work in conjunction with a client process, such as an update client, that is executing on the machine to guarantee execution of software programs by the update client only during available service windows. In this manner, service windows provide administrators the ability to control when a program is allowed to execute on the machines (i.e., client and/or server machines) in their environment. For example, an administrator can define a service window or multiple service windows for deployment on each of the machines in a collection of machines in his/her environment. When deployed, the service windows allow the software programs and updates targeted to each of these machines to execute only in one of the specified service windows.

In some embodiments, a service window specifies a time window with a start and end time that may span across days. The specified time window indicates the time period during which a program is allowed to execute. For example, an administrator can use a service window to specify certain hours of the week during which the update client on the machines can execute the targeted software programs and software updates. A software program may be executed during a service window when the service window becomes available. In the context of a software program, a service window is considered available when (1) the current time is within the time window specified in the service window, and (2) there is sufficient time remaining in the service window (i.e., the length of time from the current time to the end of the time window) for the software program to execute. An administrator can assign an approximate execution time to the software program. This enables the update client to determine whether there is sufficient time for the software program to execute. If an approximate execution time is not provided for a software program, the update client may assign a default value to the approximate execution time. For example, the default value may be based on factors such as, by way of example, the time of day, the size of the software program, the current load on the machine, etc.

In some embodiments, a software program that is running while a service window is available (i.e., the software program is running during the service window) and which continues to run beyond the time the service window ends, will be allowed to run until the software program finishes running or until a predetermined maximum runtime is reached. In the instance where the predetermined runtime is reached without the software program having completed, the software program can be "orphaned." Alternatively, in other embodiments, the software program that continues to execute beyond the service window can be terminated, for example, by the update client. In some embodiments, a software program that continues to run beyond the time an available service window ends is not permitted to reboot the machine. For example, a software program may include an instruction to perform a reboot of the machine. If this software program starts to run while a service window is available and attempts to execute this instruction (i.e., perform the reboot) after the service window ends, the software program will be stopped from executing the reboot instruction (e.g., the reboot operation will be intercepted and not performed). In some embodiments, the software program may have associated an indication to override the reboot restriction. For example, an administrator may be able to set an override reboot flag to indicate that the software program is to be allowed to reboot the machine even if the software program attempts the reboot after a service window ends. If the override reboot flag is set for a software program, the software program will not be stopped from executing a reboot instruction after the service window ends.

In some embodiments, a service window may specify an impact level. For example, the impact level may be specified as a range between "1" (low) to "10" (high). An administrator is able to specify an impact level for a service window. Likewise, the administrator can assign an impact level to a software program, where the impact level is an indication of the impact the software program has on the machine. When an impact level is specified for a service window, only the software programs that are of equal or lower impact level of the service window can be executed in the service window. If an impact level is not provided for a software program, the update client may assign the software program a default impact level. For example, the update client may assign the software program the highest impact level.

In some embodiments, a service window may specify a priority level. For example, the priority level may be specified as a range between "1" (low) to "10" (high). An administrator is able to specify a priority level for a service window. Likewise, the administrator can assign a priority to a software program, where the priority is an indication of the importance of the software program. For example, a virus attack fix program is more important than a simple program feature enhancement, and the virus attack fix is likely to be assigned a higher priority than the feature enhancement. When a priority level is specified for a service window, only the software programs that are of the same or higher priority than the priority level of the service window can be executed in the service window. If an impact level is not provided for a software program, the update client may assign the software program a default priority. For example, the update client may assign the software program the lowest priority. In some embodiments, the software programs are executed based on their priority order during an available service window. For example, when multiple software programs can be executed in a service window, the software programs are executed based on the priority assigned to each of the programs, from the higher priority program to the lower priority program.

In some embodiments, a service window may specify whether or not the service window is enabled (i.e., whether or not the service window is active). For example, a service window may include an enable/disable flag that may be used to indicate whether the service window is enabled. An administrator can use the enable/disable flag to indicate that the service window is either enabled or disabled. If the service window is enabled, the service window is considered by the update client when executing software programs. Conversely, if the service window is disabled, the service window is not considered by the update client when executing software programs.

In some embodiments, the service window or windows on a machine may be overridden. A software program may have associated a service window override indicator that is used to override the application of the service windows to this software program. If the service window override indicator is set or present, then the update client executes the software program without applying the service window. Stated differently, if the service window override indicator is set, the software program is executed without checking for an available service window. This feature provides administrators an option to override service windows, for example, to run critical software programs, such as security software programs or updates, based on critical business needs.

In some embodiments, the service windows and software programs may be deployed to the machines using a software distribution infrastructure, such as that provided by MICROSOFT's System Management Server (SMS). The SMS architecture provides a comprehensive solution for change and configuration management of large groups of WINDOWS-based machines. SMS provides administrators the ability to manage the machines on a network, distribute software to the machines from a central location, detect the machines on the network, track software and hardware configurations, and perform other tasks on the machines from a remote location.

The SMS infrastructure constitutes but one suitable paradigm with which the service windows and software programs may be deployed to the machines. One skilled in the art will appreciate that other paradigms provided by any of a variety of well-known software configuration and release management systems may be utilized to deploy the service windows and software programs to the machines. One skilled in the art will also appreciate that the service windows and software programs may be deployed to the machines without utilizing the services provided by a software configuration and release management system.

FIG. 1 is a high-level block diagram illustrating an example environment in which a service window deployment system may operate. The operating environment is only one example of a suitable operating environment and is not intended to suggest any limitation as to the scope of use or functionality of the service window deployment system. As depicted, the environment comprises a management server 102, a distribution server 104, and a collection 106 of machines 106a-n, each coupled to a network 108. Only one management server, distribution server, and collection are shown in FIG. 1 for simplicity and one skilled in the art will appreciate that the management server and the distribution server may each be comprised of a plurality of servers, and that there may be other collections of machines. As used herein, the terms "connected," "coupled," or any variant thereof, means any connection or coupling, either direct or indirect, between two or more elements; the coupling or connection between the elements can be physical, logical, or a combination thereof.

In general terms, the management server facilitates configuration management and release management of the collection of machines. The management server provides a management console with which an administrator can create policies for the deployment of service windows and content images (i.e., the software program images) on the collection of machines. In some embodiments, the management console may provide a wizard, a graphical user interface, and/or other suitable editor that provides the administrator the capability to create policies, such as a content distribution policy, a content image policy, and a service window policy. For example, the wizard may ask the administrator a number of simple questions, and using the responses to the asked questions, the wizard may build the appropriate policies for the administrator. The content distribution policy contains the properties for distributing a content image to a targeted collection of machines. The content image policy is associated with a content image, and contains the properties of the associated content image. The service window policy is targeted to a collection of machines, and contains one or more service windows, including the properties of each of the contained service windows. The management server may maintain the policies and the content images in a persistent data store, such as a database.

In general terms, the distribution server serves as a distribution point where the machines can obtain the content images. For example, the management server can distribute the content images to the distribution server or multiple distribution servers, and the individual machines can obtain the content images from the distribution server.

In general terms, a collection defines a group of one or more machines. For example, all machines that are "data centers" may be defined to be in one collection. Similarly, all machines that are in a certain locale (e.g., all machines in building 4, floors 1-3) may be defined to be in one collection.

In a typical scenario, an administrator uses the management server's administrator console to create the policies (e.g., the content distribution policies, the content image policies, and the service window policy) and to specify the targeted collection of machines to which the policies apply. For example, the administrator can create a content distribution policy for each content image that is to be deployed to the collection of machines. For each content image, the administrator can create/update/modify a content image policy to specify the properties of the content image. The administrator can also create/update/modify a service window policy, including the service windows specified in the policy, which is to be deployed on the collection of machines. Once the policies are created, the administrator can use the management server to distribute the content images to appropriate distribution servers. On each of the machines, a client process, such as an update client, periodically queries the management server for new policies that are targeted to the machine. In response, the machine receives from the management server any new content distribution policies and service window policy. The client process on each machine then processes the newly received policies. For example, the client process obtains from the appropriate distribution server the content images and their associated content image policies based on the new content distribution policies received from the management server. The client process on each machine then executes the obtained content images based on their associated content image policies and the service window policy.

In general terms, the network is a communications link that facilitates the transfer of electronic content between, for example, the attached collection of machines, management server and distribution server. In some embodiments, the network includes the Internet. It will be appreciated that the network may be comprised of one or more other types of networks, such as a local area network, a wide area network, a point-to-point dial-up connection, and the like.

The computing device on which the service window deployment system, including the target machines, management server and distribution server, is implemented may include a central processing unit, memory, input devices (e.g., keyboard and pointing devices), output devices (e.g., display devices), and storage devices (e.g., disk drives). The memory and storage devices are computer-readable media that may contain instructions that implement the service window deployment system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
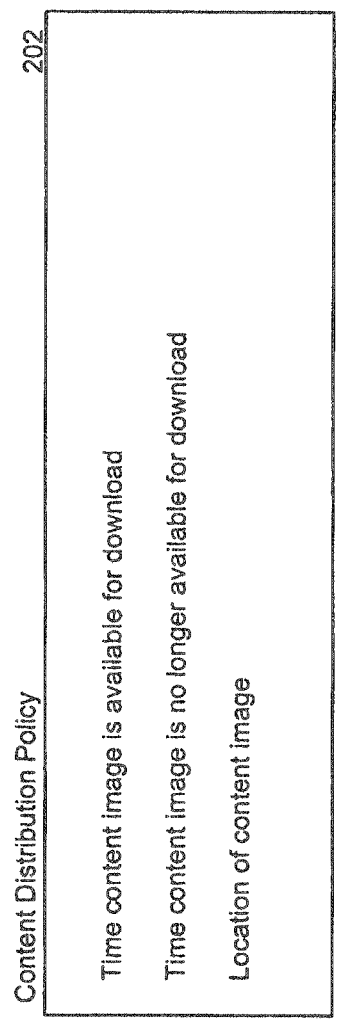
FIG. 2 is a block diagram that illustrates an example content distribution policy, according to some embodiments.

FIG. 2 is a block diagram that illustrates an example content distribution policy, according to some embodiments. A content distribution policy may be created by an administrator for each content image that is to be downloaded and executed on the targeted collection of machines and contains one or more properties that govern the downloading of the content image by each of the machines. As depicted, a content distribution policy 202 comprises an indication of a time when the content image is available for downloading onto the machine, an indication of a time after which the content image is no longer available for downloading onto the machine, and an indication of the location where the content image can be downloaded from (e.g., the distribution server where the content image can be obtained).

Figure 3:
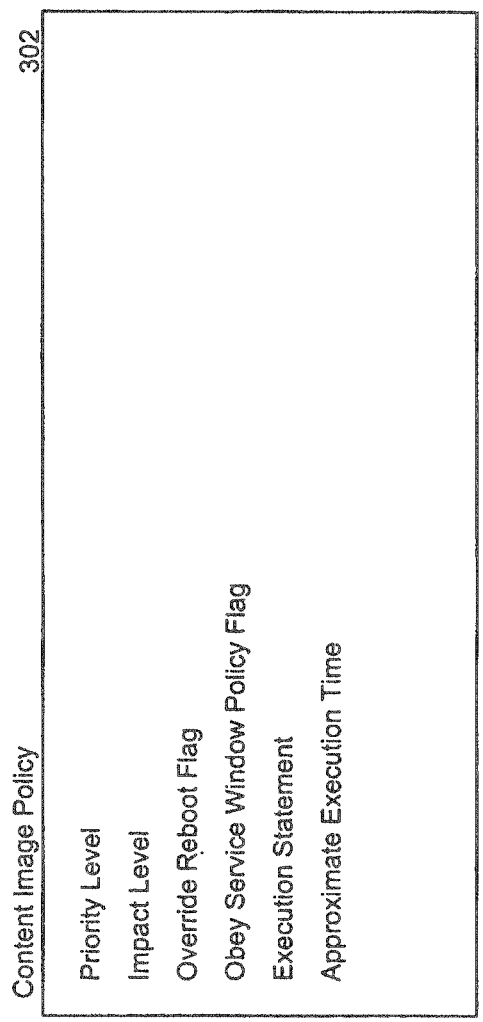
FIG. 3 is a block diagram that illustrates an example content image policy, according to some embodiments.

FIG. 3 is a block diagram that illustrates an example content image policy, according to some embodiments. A content image policy may be created by an administrator and contains one or more properties of a corresponding content image. As depicted, content image policy 302 comprises a priority level, an impact level, an override reboot flag, an obey service window policy flag, an execution statement, and an approximate execution time. The priority level, when provided, specifies the priority of the corresponding content image. The impact level, when provided, is an estimation of the level of impact the corresponding content image will have on the machine. The override reboot flag, when provided, indicates whether or not the corresponding content image should be allowed to reboot the machine while executing outside a service window. The obey service window policy flag, when provided, indicates whether the service window policy is to be applied to the corresponding content image. The execution statement specifies the manner in which the corresponding content image is to be executed. The approximate execution time is an estimation of the amount of time required for the corresponding content image to execute.

Figure 4:
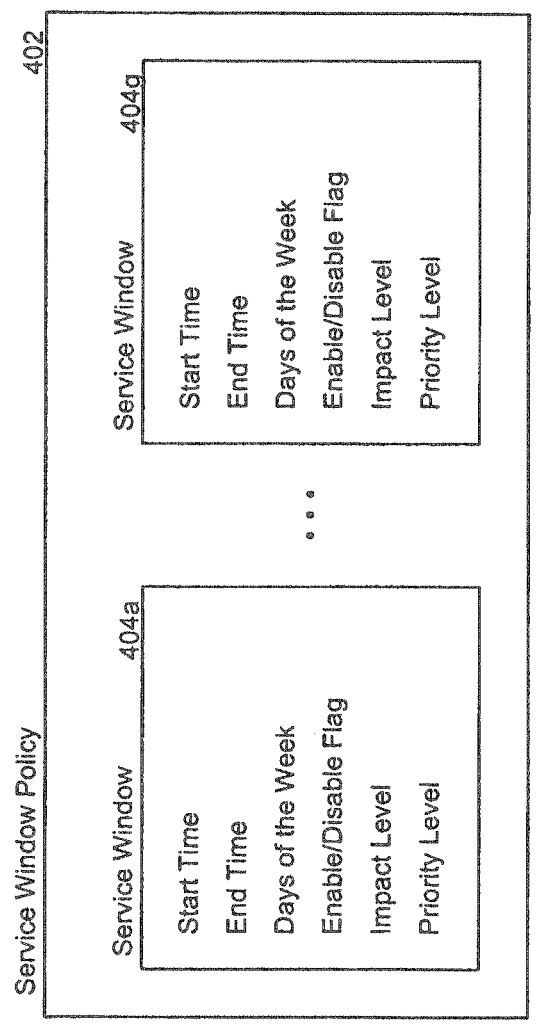
FIG. 4 is a block diagram that illustrates an example service window policy, according to some embodiments.

FIG. 4 is a block diagram that illustrates an example service window policy, according to some embodiments. A service window policy may be created by an administrator to control the execution of content images on the machines in their environment. A service window policy comprises one or more service windows, for example, service windows 404a-g. Thus, the service window policy allows multiple service windows to be targeted (or no longer targeted) at collections of machines. Each service window in the service window policy defines a service window and contains the properties of the defined service window. As depicted in FIG. 4, the service window comprises a start time, an end time, days of the week, an enable/disable flag, an impact level, and a priority level. The start time and the end time specify the starting time and the ending time, respectively, of the defined service window. The days of the week indicates the days the defined service window is available (i.e., active). The enable/disable flag, when provided, indicates whether the service window is to be enabled or disabled. For example, disabling a service window is akin to removing the service window from the service window policy. The impact level, when provided, specifies the maximum impact level of the content image that is allowed to execute during the defined service window. The priority level, when provided, specifies the minimum priority of the content image that is allowed to execute during the defined service window. One of ordinary skill in the art will appreciate that one or more properties may be optional and not provided for a service window. Moreover, the service windows contained in a service window policy may contain different properties. Stated differently, the service windows contained in a service window need not contain the same properties.

Figure 5:
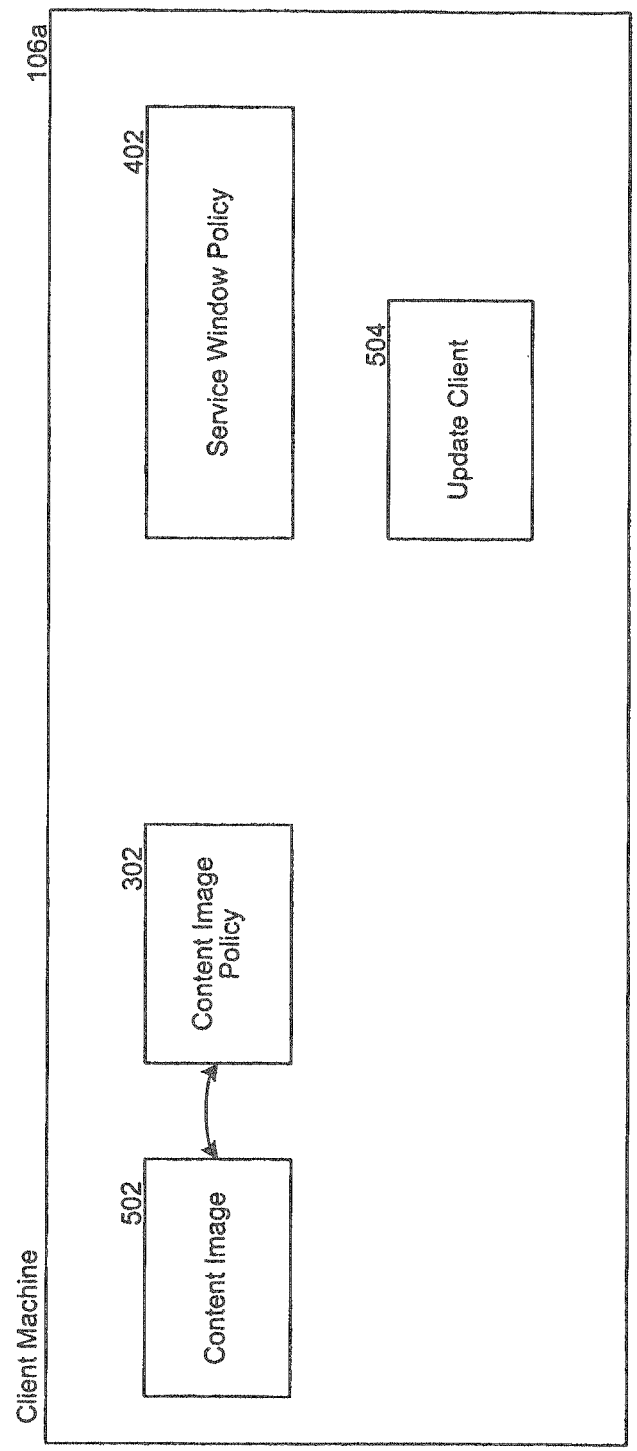
FIG. 5 is a block diagram that illustrates selected components of a client machine, according to some embodiments.

FIG. 5 is a block diagram that illustrates selected components of a client machine, according to some embodiments. As depicted, client machine 106a comprises a content image 502 and corresponding content image policy 302, service window policy 402, and an update client 504. The content image is a software program image that is to be executed on the machine. The content image policy contains the properties of the corresponding content image. The update client is a client process that executes on the client machine, and functions to query the management server for new policies, process the policies received from the management server, for example, to download the content image and its corresponding content image policy, and to execute the content image based on the content image policy and the service window policy.

Figure 6:
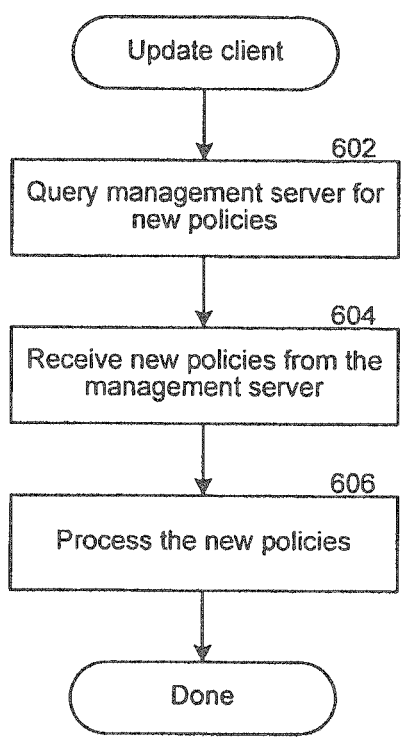
FIG. 6 is a flow diagram that illustrates the processing of an update client on a client machine to retrieve applicable policies, according to some embodiments.

FIG. 6 is a flow diagram that illustrates the processing of an update client on a client machine to retrieve applicable policies, according to some embodiments. In block 602, the update client queries the management server for new policies that are targeted for the client machine. In block 604, the update client receives the new policies from the management server. In block 606, the update client processes the new policies that are received from the management server. For example, the update client may process a content distribution policy by downloading the corresponding content image and its content image policy based on the contents of the content distribution policy and, once downloaded onto the client machine, execute the content image based on the content image policy and the service window policy.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 7:
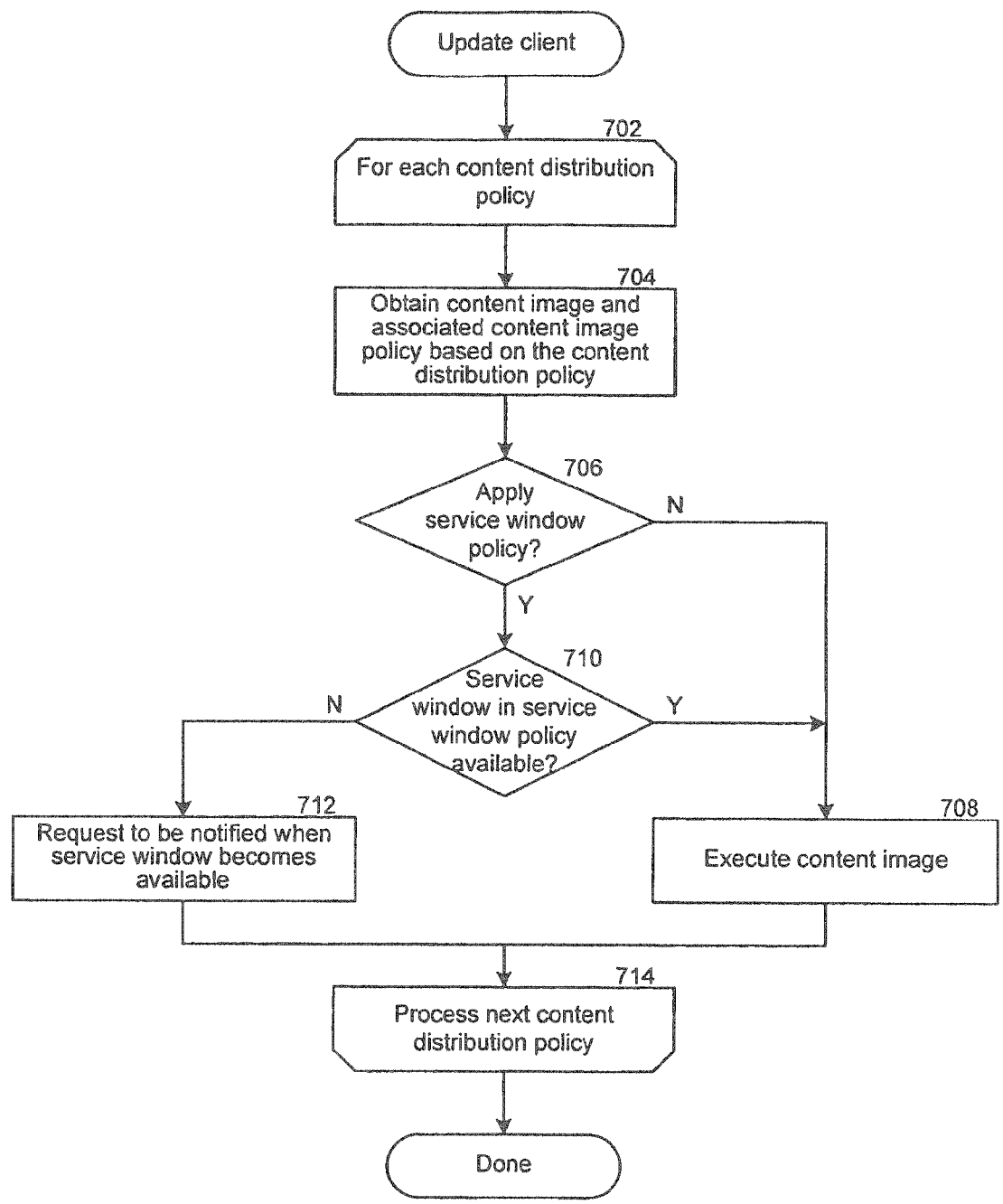
FIG. 7 is a flow diagram that illustrates the processing of an update client on a client machine to execute a content image, according to some embodiments.

FIG. 7 is a flow diagram that illustrates the processing of an update client on a client machine to execute a content image, according to some embodiments. For each content distribution policy that is received from the management server and which needs be processed on the client machine (block 702), the update client performs blocks 704 to 712, until all the content distribution policies have been processed (block 714). In block 704, the update client obtains the content image and the associated content image policy based on the content distribution policy. In block 706, the update client checks the content image policy to determine if the service window policy is to be applied. If the content image policy specifies that the service window policy is not to be applied to the execution of the content image, then, in block 708, the update client executes the content image on the client machine, and proceeds to process the next content distribution policy. Otherwise, if the update client determines from the content image policy that the service window policy is to be applied to the execution of the content image, then, in block 710, the update client checks the service window policy to determine if a service window is available. If a service window is available, the update client executes the content image during the available service window (block 708), and proceeds to process the next content distribution policy. Otherwise, if the update client determines that no service windows in the service window policy are available, then, in block 712, the update client issues a request to be notified when a service window becomes available, and proceeds to process the next content distribution policy. For example, the update client may set an interrupt with the operating system executing on the client machine to be invoked when a service window becomes available, or may periodically poll for available service windows.

Figure 8:
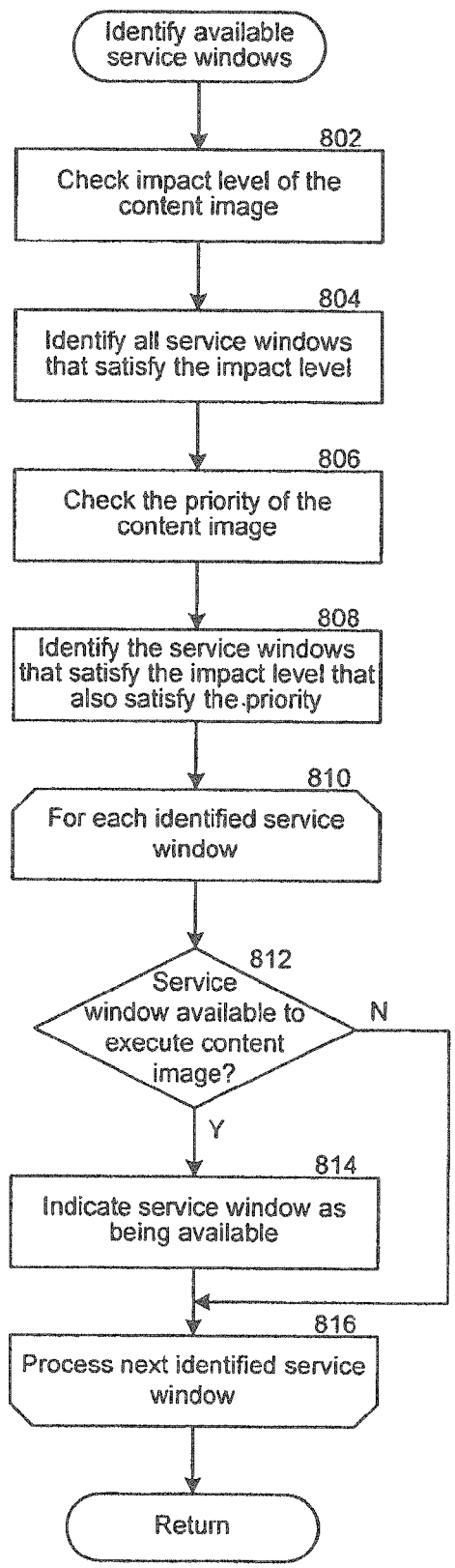
FIG. 8 is a flow diagram that illustrates the processing of an update client on a client machine to identify available service windows, according to some embodiments.

FIG. 8 is a flow diagram that illustrates the processing of an update client on a client machine to identify available service windows, according to some embodiments. In block 802, the update client determines the impact level of the content image. In some embodiments, if an impact level is not provided for the content image, the update client assigns the content image a default impact level. In block 804, the update client identifies all the service windows defined in the service window policy that satisfy the impact level of the content image. For example, the update client identifies all the service windows that are assigned an impact level at least as high as the impact level of the content image. In block 806, the update client determines the priority assigned to the content image. In some embodiments, if priority is not assigned to the content image, the update client assigns the content image a default priority. In block 808, the update client identifies the service windows that satisfy the impact level that also satisfy the priority assigned to the content image. For example, from the service windows that satisfy the impact level, the update client identifies all the service windows that are assigned a priority level that is the same or lower than the priority assigned to the content image. Then, for each of the identified service windows (block 810), the update client performs blocks 812 and 814, until all of the identified service windows are processed (block 816). In block 812, the update client checks the service window to determine whether the service window is available for executing the content image. For example, the update client can check the service window to determine that there is sufficient time remaining in the service window to execute the content image. If the service window is available for executing the content image, then, in block 814, the update client indicates that the service window is available, and proceeds to process the next identified service window. Otherwise, if the service window is not available for executing the content image, the update client proceeds to process the next identified service window.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computer system for guaranteeing execution of a content image, the method comprising:
    under the control of an update client executing on the computer system,
        obtaining the content image and its associated content image policy for execution of the content image on the computer system, the content image policy specifying attributes specific to the content image including an approximate execution time for the content image and an indication whether to obey or not obey a service window policy of the computer system;
    when the content image policy indicates to obey a service window policy,
        determining whether a service window is available for executing the content image, a service window is available when a present time is at least a start time of the service window and time from the present time to an end time of the service window is at least the approximate execution time for the content image; and
        upon determining that the service window is available, executing the content image on the computer system; and
    when the content image policy indicates to not obey a service window policy, executing the content image on the computer system without regard to any service window policy.

2. The method of claim 1 further comprising, upon determining that no service windows are available, requesting to be notified when a service window becomes available.

3. The method of claim 2, wherein a service window becomes available when a present time is between a start time and an end time of the service window.

4. The method of claim 1, wherein an impact level is used in determining whether a service window is available for executing the content image.

5. The method of claim 1, wherein a priority level is used in determining whether a service window is available for executing the content image.

6. The method of claim 1 further comprising, upon determining that the content image is executing beyond the end time of the available service window, prohibiting the content image from rebooting the computer system.

7. The method of claim 1 further comprising, upon determining that the content image is executing beyond the end time of the available service window, allowing the content image to execute until a predetermined maximum runtime is reached.

8. A computer-readable medium that is not a signal whose contents comprise computer-executable instructions that cause a computer system to:
    obtain a content image and its associated content image policy for execution on the computer system, the content image policy specifying attributes specific to the content image including an approximate execution time for the content image and an indication whether to obey or not obey a service window policy of the computer system;
    when the content image policy indicates to obey a service window policy,
        determine whether a service window is available for executing the content image by comparing a present time, a start time and an end time of the service window, and the approximate execution time for the content image to ensure that the present time is at or later than the start time and time left in the service window is at least the approximate execution time; and
        when a service window is available, start execution of the content image on the computer system during the service window; and
    when the content image policy indicates to not obey a service window policy, start execution of the content image on the computer system without regard to any service window policy.

9. The computer-readable medium of claim 8 further comprising contents that cause the computer system to, upon determining that no service windows are available, request to be notified when a service window becomes available.

10. The computer-readable medium of claim 8, wherein an impact level is specified in the service window, and further wherein the impact level is used to determine that the service window is available for executing the content image.

11. The computer-readable medium of claim 8, wherein an enable/disable flag is specified in the service window, and further wherein the enable/disable flag is used to determine that the service window is available for executing the content image.

12. The computer-readable medium of claim 8, wherein a priority level is specified in the service window, and further wherein the priority level is used to determine that the service window is available for executing the content image.

13. The computer-readable medium of claim 8 further comprising contents that cause the computer system to, upon determining that the content image is executing beyond the end time of the available service window, prohibit the content image from rebooting the computer system.

14. The computer-readable medium of claim 8 further comprising contents that cause the computer system to, upon determining that the content image is executing beyond the end time of the available service window, allow the content image to execute until a predetermined maximum runtime is reached.

15. A computer system for enforcing a service policy for execution of a content image, the computer system comprising:
    a computer-readable medium storing computer-executable instructions that control the computer system to:
        obtain a content image and its associated content image policy for execution on a computing system, the content image policy specifying attributes specific to the content image including an approximate execution time for the content image and an indication whether to obey or not obey a service window policy of the computing system;
    when the content image policy indicates to obey a service window policy of the computing system,
        determine whether a service window is available for executing the content image by comparing a present time, a start time and an end time of the service window, and the approximate execution time for the content image to ensure that the present time is within the service window and enough time is left in the service window to complete execution of the content image; and when a service window is available, start execution of the content image on the computing system during the service window; and when the content image policy indicates to not obey a service window policy, start execution of the content image on the computing system without regard to any service window policy; and a processor for executing the computer-executable instructions stored in the computer-readable medium.

* * * * *